United States Patent
Durling

(10) Patent No.: US 7,021,275 B2
(45) Date of Patent: Apr. 4, 2006

(54) IGNITER FOR INTERNAL COMBUSTION ENGINES OPERATING OVER A WIDE RANGE OF AIR FUEL RATIOS

(75) Inventor: Harold E. Durling, Elsie, MI (US)

(73) Assignee: Savage Enterprises, Inc., Eagan, MN (US)

( * ) Notice: Subject to any disclaimer, the term of this patent is extended or adjusted under 35 U.S.C. 154(b) by 0 days.

(21) Appl. No.: 10/451,492

(22) PCT Filed: Sep. 7, 2001

(86) PCT No.: PCT/US01/28114

§ 371 (c)(1),
(2), (4) Date: Dec. 23, 2003

(87) PCT Pub. No.: WO02/20982

PCT Pub. Date: Mar. 14, 2002

(65) Prior Publication Data

US 2005/0056247 A1    Mar. 17, 2005

Related U.S. Application Data

(60) Provisional application No. 60/230,982, filed on Sep. 7, 2000.

(51) Int. Cl.
*F02M 57/06* (2006.01)
*F02B 19/10* (2006.01)

(52) U.S. Cl. ............... 123/297; 123/299; 123/266; 123/275; 123/287; 123/169 E; 123/169 MG

(58) Field of Classification Search ............ 123/297, 123/268, 286, 258, 264, 260, 266, 269, 285, 123/277, 278, 295, 299, 275, 287, 169 E, 123/169 MG
See application file for complete search history.

(56) References Cited

U.S. PATENT DOCUMENTS

| 4,319,552 A | * | 3/1982 | Sauer et al. ............... 123/297 |
| 4,393,687 A | * | 7/1983 | Muller et al. ............. 73/35.07 |
| 4,499,399 A | * | 2/1985 | Flores ...................... 313/143 |
| 4,926,818 A |   | 5/1990 | Oppenheim et al. |

(Continued)

FOREIGN PATENT DOCUMENTS

DE    3001711 A1    7/1981

(Continued)

*Primary Examiner*—Hai Huynh
(74) *Attorney, Agent, or Firm*—Moore, Hansen & Sumner

(57) ABSTRACT

An igniter for ignition over a wide air/fuel ratio range. Igniter includes an igniter body including an internal cavity disposed substantially within the igniter body, an internal spark gap disposed substantially within the internal cavity, an external spark gap disposed substantially on an exposed surface of the igniter body, and a fuel charge delivery system for delivering a fuel charge to the internal cavity. A method for compression-igniting an air/fuel mixture in a cylinder of a internal combustion engine, the method comprising introducing a substantially homogenous charge of a first air/fuel mixture into a cylinder of the internal combustion engine during an intake stroke, compressing the substantially homogenous charge of the first air/fuel mixture in the cylinder of the internal combustion engine during a compression stoke, and combusting the substantially homogenous charge of the first air/fuel mixture in the cylinder of the internal combustion engine during a power stroke by injecting partially combusted products of a second air/fuel mixture into the cylinder, with the first air/fuel mixture having a substantially higher ratio, by weight, of air to fuel and the second air/fuel mixture.

16 Claims, 1 Drawing Sheet

U.S. PATENT DOCUMENTS

| | | | |
|---|---|---|---|
| 4,987,868 A * | 1/1991 | Richardson | 123/260 |
| 5,405,280 A * | 4/1995 | Polikarpus et al. | 445/7 |
| 5,421,300 A * | 6/1995 | Durling et al. | 123/266 |
| 5,715,788 A * | 2/1998 | Tarr et al. | 123/297 |
| 5,947,076 A * | 9/1999 | Srinivasan et al. | 123/267 |
| 6,029,623 A * | 2/2000 | Weissman et al. | 123/299 |
| 6,135,084 A | 10/2000 | Corneer | 123/259 |
| 6,202,601 B1 * | 3/2001 | Ouellette et al. | 123/27 GE |
| 6,213,085 B1 * | 4/2001 | Durling et al. | 123/266 |
| 6,213,086 B1 * | 4/2001 | Chmela et al. | 123/276 |
| 6,359,377 B1 * | 3/2002 | Durling | 313/141 |
| 6,460,506 B1 * | 10/2002 | Nevinger | 123/260 |
| 6,497,846 B1 * | 12/2002 | Okada et al. | 422/171 |
| 6,557,508 B1 * | 5/2003 | Labarge et al. | 123/169 EL |
| 6,595,181 B1 * | 7/2003 | Najt et al. | 123/295 |
| 6,595,182 B1 * | 7/2003 | Oprea et al. | 123/297 |
| 6,611,083 B1 * | 8/2003 | LaBarge et al. | 313/140 |
| 6,694,944 B1 * | 2/2004 | Agama et al. | 123/292 |
| 6,755,175 B1 * | 6/2004 | McKay et al. | 123/297 |
| 6,840,209 B1 * | 1/2005 | Shimazaki | 123/276 |
| 6,953,020 B1 * | 10/2005 | Kojic et al. | 123/256 |
| 2003/0075121 A1 * | 4/2003 | Dixon | 123/48 A |
| 2004/0149256 A1 * | 8/2004 | Dye et al. | 123/297 |
| 2004/0250790 A1 * | 12/2004 | Heywood et al. | 123/300 |
| 2005/0000484 A1 * | 1/2005 | Schultz et al. | 123/266 |

FOREIGN PATENT DOCUMENTS

| | | |
|---|---|---|
| DE | 19519663 A1 | 5/1996 |
| DE | 19927479 A1 | 12/1999 |

* cited by examiner

IGNITER FOR INTERNAL COMBUSTION ENGINES OPERATING OVER A WIDE RANGE OF AIR FUEL RATIOS

This application is being filed as a PCT International Patent Application in the name of Savage Enterprises, Inc., a U.S. national corporation and resident, (Applicant for all countries except US) and Harold E. Durling, a U.S. resident and citizen (Applicant for US only), on 7 Sep. 2001, designating all countries and claiming priority to U.S. Ser. No. 60/230,982 filed 7 Sep. 2000.

TECHNICAL FIELD

The present invention relates generally to an igniter for use in internal combustion engines. More particularly, the invention relates to an internal combustion igniter, which permits the engine to be operated in a "spark-ignited" mode of operation (with a relatively rich fuel to air ratio) during periods of relatively heavy load and in a diesel mode of operation (with a relatively lean fuel to air ratio) during periods of relatively light load.

BACKGROUND

Internal combustion engines (i.e., those having an intake stroke, a compression stroke, a power stroke, and an exhaust stroke, either as separate strokes (four-stroke) or combined (two-stroke) events) may be divided into two general types: spark-ignited and compression-ignited (e.g., diesel).

Spark-ignited engines and compression-ignited engines each have distinct advantages and disadvantages. For example, as versus compression-ignited engines, spark-ignited engines are generally less expensive to produce, have a greater power density (i.e., horsepower produced per volume of cylinder displacement), and are usually supplied with stoichiometric air/fuel ratios that produce relatively low levels of pollutant emissions. The pollutants that are produced by spark-ignited engines run with stoichiometric air/fuel ratios can also be further reduced to currently acceptable levels by utilizing the post-combustion catalytic converter technology available today.

However, the stoichiometric air/fuel ratios required by spark-ignited engines are generally much richer as compared to the air/fuel ratios utilized in compression-ignited (e.g., diesel) engines. Whereas a spark-ignited engine may run on an air/fuel ratio in the ratio of 20:1, a compression-ignited engine may utilize a much higher air/fuel ratio in the range of 40:1 or 50:1. Therefore, compression-ignited engines generally exhibit better fuel economy.

Compression-ignited engines, which run on such lean air/fuel mixtures and do not operate nearly as close to stoichiometric conditions as spark-ignited engines, tend to produce a higher rate of undesirable emission pollutants. Moreover, the emission pollutants that are produced by compression-ignited engines are not nearly as amenable to treatment by the post-combustion catalytic technology currently available, as are the pollutants produced by spark-ignited engines. Chief among the pollutants produced by combustion-ignition engines are nitrogen-containing compounds (i.e., NOX). Such nitrogen-containing compounds result, at least in part, from the high temperatures produced during compression-ignition. Soot is another pollutant produced in greater quantities during combustion-ignition, and arises primarily from the manner in which fuel droplets sprayed into the hot compressed air burn.

Additionally, as noted above, compression-ignition engines tend to have a significantly lower "power density" as compared to spark-ignited engines. For example, while a high performance spark-ignited engine may produce in the range of 60 horsepower per liter of engine displacement, a compression-ignited engine may produce only in the range of about 10 horsepower per liter of engine displacement. A need exists for improvements.

SUMMARY OF THE DISCLOSURE

An igniter for an internal combustion engine operating over a substantially wide range of air/fuel ratios, the igniter including an igniter body. The igniter body further includes an internal cavity disposed within the igniter body, an internal spark gap disposed within the internal cavity and an external spark gap disposed substantially on an exposed surface of the igniter body. The igniter also includes a fuel charge delivery system for delivering a fuel charge to the internal cavity.

A method for operating an internal combustion engine including determining a load threshold within a load range of the internal combustion engine, operating the internal combustion engine in a spark-ignited mode of operation when the determined load threshold is exceeded, operating the internal combustion engine in a homogenous-charge compression-ignited mode of operation when the determined load threshold is not attained. The homogenous-charge compression-ignited mode of operation further includes introducing a substantially homogenous charge of an air/fuel mixture into a cylinder of the internal combustion engine during an intake stroke, compressing the substantially homogenous charge of the air/fuel mixture in the cylinder of the internal combustion engine during a compression stoke, and combusting the substantially homogenous charge of the air/fuel mixture in the cylinder of the internal combustion engine during a power stroke by injecting active radicals of combustion in to the cylinder.

DETAILED DESCRIPTION

Figure 1:
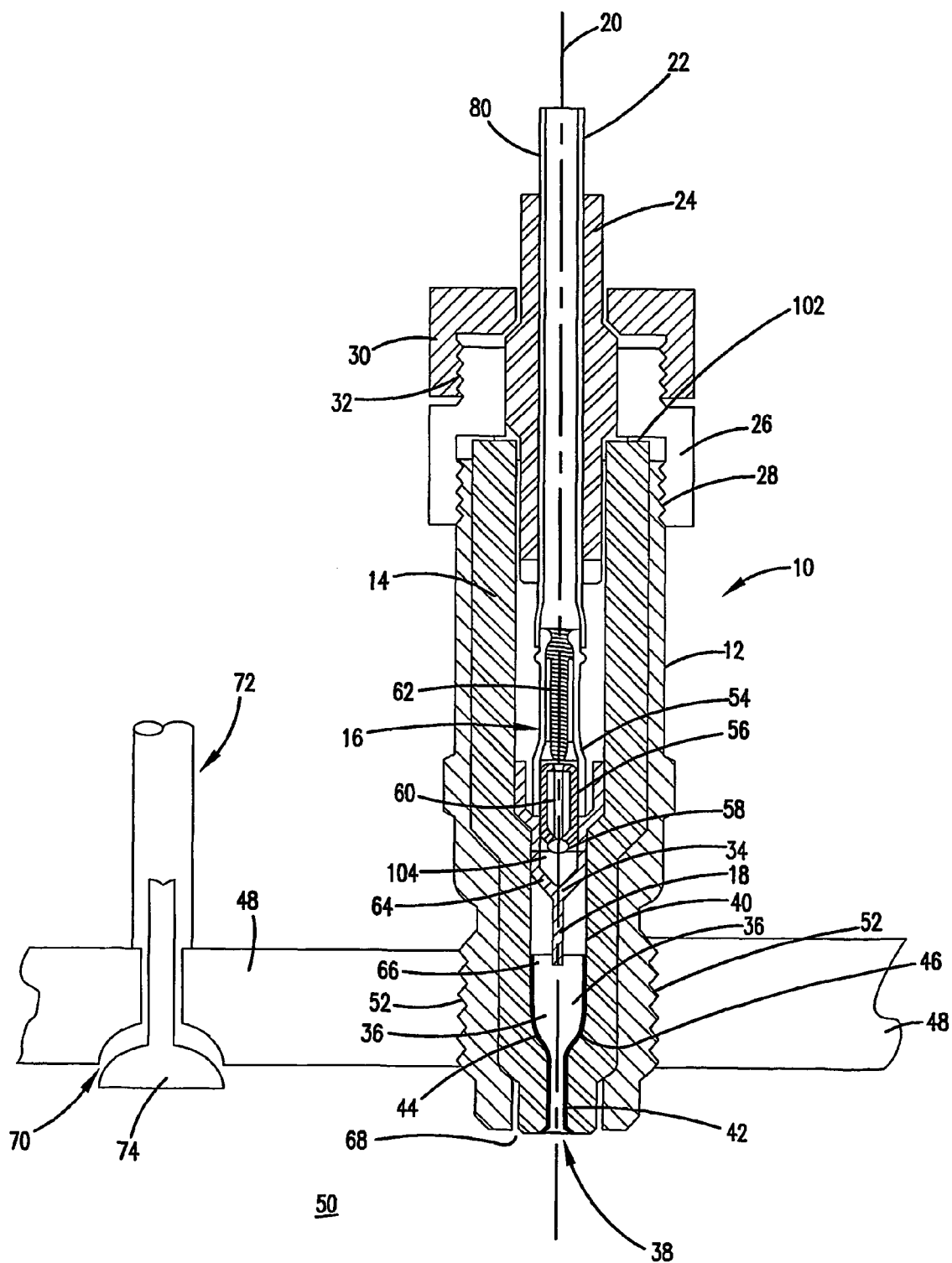
FIG. 1 is a cross-sectional view of an example embodiment of an igniter or spark plug of the present invention for a use in a combustion engine.

Referring to FIG. 1, an example embodiment of an igniter 10, or spark plug, of the present invention is shown. An advantage of the embodiment described is that it is functional in an internal combustion engine utilizing a wide range of air/fuel ratios. Igniter 10 includes, proceeding radially from its exterior surface inward, a cylindrical shell 12 (preferably formed of a metal, such as steel), a primary cylindrical insulator member 14, a fuel or chemical charge delivery system 16 and a first gap electrode 18, shown in this embodiment, axially aligned and disposed substantially along an elongated central axis 20 of igniter 10.

In the example embodiment shown, fuel or chemical charge delivery system 16 is a conventional liquid fuel injection nozzle (described more fully below), which is supplied with a fuel or chemical mixture through a delivery conduit 22 that also extends along central axis 20. Delivery conduit 22 passes centrally through a secondary cylindrical insulator member 24, which mates into and is positioned adjacent primary cylindrical insulator member 14. A first jam nut 26 threadingly engages shell 12, through threads 28, and contacts a shoulder 102 of primary cylindrical insulator member 14 to retain it in place against member shell 12. Second cylindrical insulator member 24 is retained through the provision of a second jam nut 30, which threadingly engages first jam nut 26 through threads 32.

The above description of construction details relating to the first and second insulator members 14 and 24, respectively, and the first and second jam nuts 26 and 30, respectively, apply to a prototypical model of igniter 10 presently constructed. One of skill in the art will appreciate that for manufacturability purposes, a mass-produced igniter 10 could employ a single cylindrical insulator member and could also dispense with the jam nuts 26 and 30, respectively, employing instead a crimping of the shell 12 to retain such single cylindrical insulator member in place.

In the example embodiment shown, a lower end 104 of the fuel charge delivery system 16 is received within the interior diameter of a tapering cylinder portion 34 of first electrode member 18, which has a wider upper end portion for seating the fuel charge delivery system 16, and a narrower lower end portion from which rod-shaped central electrode 18 projects downward. Surrounding central electrode 18 and extending downward from tapering cylindrical portion 34 of member first electrode 18, the interior of the igniter is provided with an internal cavity 36, which terminates in an outwardly opening orifice 38. Internal cavity 36 is bounded by primary cylindrical insulator 14, which has an upper substantially cylindrical sidewall portion 40, a lower substantially cylindrical sidewall portion 42, and a tapering sidewall portion 44 extending therebetween.

In the example embodiment shown, an intermediate electrode 46 including a conducting material extends upwardly from orifice 38 to a point proximate the tip of central electrode 18. Preferably, intermediate electrode 46 conforms substantially to the shape of and closely contacts the sidewall portions 40, 42, and 44. More preferably, the intermediate electrode 46 is provided in the form of a coating which overlays the sidewall portions 40, 42, and 44. The coating preferably includes a catalyst to promote rapid combustion of a fuel charge delivered to and combusted within internal cavity 36. Examples of catalysts are platinum and platinum-containing substances and compounds.

Igniter 10 is mounted in a cylinder head 48 and projects through cylinder head 48 (shown in partial view) into a cylinder of an internal combustion engine 50. Igniter 10 engages cylinder head 48 through the provision of interlocking threads 52. In the example embodiment shown in FIG. 1, charge delivery system 16 is a liquid fuel injector system, including an outer housing 54, a valve seat 56 disposed within the outer housing 54, a ball-shaped valve 58 having a stem 60 projecting therefrom, and a biasing coil spring 62 surrounding stem 60. Coil spring 62 connects to an upper portion of stem 60 and is in tension so as to urge ball-shaped valve 58 upward against valve seat 56. A metered amount of a fuel charge is delivered, under pressure, through delivery conduit 22 and thence through interior of outer housing 54 of fuel charge delivery system 16. Pressurized metered fuel charge forces ball-shaped valve 58 downward and away from valve seat 56 so as to enter the wider upper end portion of the tapering cylindrical portion of member first electrode 18 in which fuel charge delivery system 16 is seated. The tapering cylindrical member is provided with at least one throughgoing aperture 64, which allows the delivered fuel charge to pass through the tapering cylindrical portion 34 of first electrode 18 and enter internal cavity 36 proximate the tip of first electrode 18.

To initiate combustion, a first voltage potential is applied to first electrode 18, communicated to first electrode 18 from an ignition system (not shown) attachment point 80 on exposed portion of the delivery conduit 22, while shell 12 of igniter 10 is maintained at a reference voltage potential. Preferably, the reference voltage at shell 12 is maintained at ground voltage, and an ignition voltage is applied to first electrode 18. More preferably, delivery conduit 22, outer housing 54 of fuel charge delivery system 16, and tapering cylindrical portion 34 of member first electrode 18, all connect electrically, in series with engine ignition system contact point 80 to the arcing tip of first electrode 18 and form, together, first terminal of the igniter 10. With the first and reference terminals at differing voltage potentials, two separate spark gaps are formed: an internal spark gap 66 between the first electrode 18 and the intermediate electrode 46 and an external spark gap 68 formed between intermediate electrode 46 and the reference electrode shell 12. Internal spark gap 66 is located within cavity 36, while external spark gap 68 is disposed substantially adjacent external surface of the lower tip of cylindrical insulator 14 of igniter 10 and found within the volume of cylinder 50. Internal spark gap 66 and external spark gap 68 are, in the embodiment shown, each of annular shape and are electrically disposed in series with one another.

When, as shown in the example embodiment of FIG. 1, the intermediate electrode 46 is configured to extend substantially around the entire circumference of internal cavity 36, an electrical capacitor is effectively formed. Intermediate electrode 46 forms one plate of the capacitor, shell 12 forms another plate of the capacitor, and cylindrical insulator member 14 forms a dielectric separator. Capacitor is connected electrically in series with internal spark gap 66 and external spark gap 68. When the ignition voltage is applied to first electrode 18, the capacitor so formed maintains intermediate electrode 46 at ground potential until internal spark gap 66 breaks down. At that point, the capacitor begins charging, with current flowing across internal spark gap 66. Capacitor subsequently discharges when voltage potential between internal electrode 44 and reference electrode shell 12 is sufficiently elevated to break down external spark gap 68. As a result of the capacitor so formed by intermediate electrode 46, reference electrode shell 12, and cylindrical insulator member 14, internal spark gap 66 and external spark gap 68 fire in series (on the order of microseconds apart) rather than simultaneously. Since internal spark gap 66 and external spark gap 68 fire sequentially rather than simultaneously, peak voltage is reduced from that which would be required to fire the two spark gaps simultaneously. In the example embodiment shown, fuel charge delivery system 16 described above forms a fuel injection nozzle 58, which delivers a metered fuel charge to a position proximate the internal spark gap 66.

An advantage of the example embodiment shown is that igniter 10 permits an internal combustion engine to be operated in a "spark-ignited" mode of operation (with a relatively rich fuel to air ratio) during periods of relatively heavy load and in a diesel mode of operation (with a relatively lean fuel to air ratio) during periods of relatively light load. When operating in a spark-ignited mode of operation, fuel charge delivery system 16 is not actuated and, therefore, the only combustible mixture delivered to the cylinder 50 is an air/fuel mixture delivered on the intake stoke in a conventional manner, e.g., through a fuel injection or carburetion system. For example, an example of a conventional intake port 70 and a conventional injection/carburetion system 72, as shown in FIG. 1, with an intake valve 74 shown in an open position, e.g., during an intake stoke. As one of skill in the art would appreciate, during an intake stroke of the internal combustion engine, a substantially well-dispersed air/fuel charge will be delivered to cylinder 50. Thereafter, intake valve 74 closes and, as cylinder 50 undergoes a compression charge, some of this charge will be forced through orifice 38, into internal cavity 36 of igniter 10. When ignition voltage is applied to central electrode 18, internal spark gap 66 and external spark gap 68 fire in series, with internal spark gap 66 firing in the range of microseconds before the firing of external spark gap 68. In this spark-ignited mode of operation, igniter 10 functions similarly to a torch jet spark plug, one example of which is disclosed in U.S. Pat. No. 5,421,300, to Durling et al. In the torch jet mode of operation, igniter 10 ignites the air/fuel mixture forced into internal cavity 36 during the compression stoke, such that a jet of partially combusted fuel emanates from orifice 38 and projects into cylinder 50, so as to enhance the burning rate of the air/fuel mixture therein. Additionally, external spark gap 68, which is disposed substantially within cylinder 50, contributes to a rapid and full combustion of the air/fuel mixture contained within cylinder 50.

Preliminary results by the applicants have indicated that the upper limit of the air to fuel ratio (by weight) achievable by this spark-ignited mode of operation is on the order of about 20:1. Leaner mixtures than this approximate 20:1 ratio of air to fuel tend to not ignite sufficiently or not ignite at all. However, leaner mixtures (e.g., above 20:1 of air/fuel) offer the possibility of achieving more efficient fuel consumption. Accordingly, the inventive igniter 10 can additionally be operated in a compression-ignition mode of operation, which preliminary results have indicated permits achieving air/fuel ratios on the order of about 40:1 or even perhaps 50:1.

In compression-ignition mode of operation, a well-dispersed and relatively lean air/fuel mixture (e.g., on the order of about 40:1 to about 50:1) is delivered to cylinder 50 during the intake stoke, and some of this relatively lean air/fuel mixture is forced into internal chamber 36 of igniter 10 during the compression stroke. At or just before ignition, a small charge of a relatively rich air/fuel mixture is delivered by fuel charge delivery system 16 to internal cavity 36 and adjacent internal spark gap 66. When the elevated ignition voltage is applied to central electrode 18, internal spark gap 66 and external spark gap 68 again fire in series, on the order of microseconds apart. The charge delivered by fuel charge delivery system 16 to internal cavity 36, together with the relatively lean mixture forced into internal cavity 36, combine into a relatively rich mixture and are ignited by the annular spark formed between central electrode 18 and internal electrode 44. A torch jet is thereby created, which ejects partially combusted products through orifice 38. Such partially combusted products are dispersed within cylinder 50 and ignite the already compressed and relatively lean main charge therein, resulting is a rapid and thorough combustion of the main charge. The resulting combustion of the main charge results primarily from compression but is triggered by the dispersion throughout the main charge of the partially combusted products emitted from internal cavity 36. An advantage of this method is that an engine using igniter 10 under a light load accomplishes homogenous compression ignition of lean air/fuel ratios by introducing charged radicals, not limited to the form of a flame, but also being heated above ambient operating conditions, into the cylinder. One of skill in the art will appreciate that, optimally, igniter 10 is timed to fire when the state of compression is optimum for lean, fuel-efficient, compression ignition, for example, by controlling the timing of compression ignition in a homogenous air/fuel mixture by "seeding" cylinder 50 with active chemical radicals-produced on demand by igniter 10. An advantage of this method of engine operation is that ignition is not limited to initiation only by a spark or only by compression, but rather by allowing the engine to choose spark and seeded compression ignition, depending on load at which the engine is operating.

While the present invention has been disclosed by way of a detailed description of a number of particularly preferred embodiments, it will be clear to those of ordinary skill that the art that various substitutions of equivalents can be affected without departing from either the spirit or scope of the invention as set forth in the appended claims.

What is claimed is:

1. An igniter for an internal combustion engine operating over a substantially wide range of air/fuel ratios, the igniter comprising:
   an igniter body defining an internal cavity;
   a first electrode disposed within the internal cavity;
   an intermediate electrode disposed within the internal cavity, the first electrode and intermediate electrode defining an internal spark gap;
   an outer electrode positioned such that the outer electrode and the intermediate electrode define an external spark gap disposed proximate an exposed surface of the igniter body; and
   a fuel charge delivery system positioned at least partially within the igniter body, the fuel charge delivery system configured to selectively deliver a fuel charge to the internal cavity.

2. An igniter for an internal combustion engine operating over a substantially wide range of air/fuel ratios, according to claim 1, wherein:
   the internal spark gap and the external spark gap are electrically connected in series.

3. An igniter for an internal combustion engine operating over a substantially wide range of air/fuel ratios, according to claim 1, wherein:
   the fuel charge delivery system comprises a fuel injection nozzle disposed substantially adjacent the internal spark gap.

4. An igniter for an internal combustion engine operating over a substantially wide range of air/fuel ratios, according to claim 3, wherein:
   the intermediate electrode and the outer electrode are spaced from one another by at least the external spark gap; and
   the first electrode and the intermediate electrode are spaced from one another by at least the internal spark gap.

5. An igniter for an internal combustion engine operating over a substantially wide range of air/fuel ratios, according to claim 4, wherein:
   the outer electrode is disposed substantially on an exterior surface of the igniter body.

6. An igniter for an internal combustion engine operating over a substantially wide range of air/fuel ratios, according to claim 4, wherein:
   the first electrode is disposed substantially centrally within the igniter body.

7. An igniter for an internal combustion engine operating over a substantially wide range of air/fuel ratios, according to claim 4, further comprising:
   an insulator body disposed substantially between the outer electrode and the first electrode;

and wherein the intermediate electrode is disposed at least substantially on an interior surface of the insulator body.

8. An igniter for an internal combustion engine operating over a substantially wide range of air/fuel ratios, according to claim 7, wherein:
the intermediate electrode comprises a coating overlying the interior surface of the insulator body, the coating comprising, at least in part, platinum.

9. An igniter for an internal combustion engine operating over a substantially wide range of air/fuel ratios, according to claim 4, further comprising:
an electrical connection for applying a voltage to the center electrode,
the electrical connection comprising:
a delivery conduit for delivering the fuel charge to the fuel injection nozzle,
the fuel injection nozzle, and
the center electrode;
the delivery conduit, the fuel injection nozzle, and the center electrode being electrically connected in series.

10. An igniter for an internal combustion engine operating over a substantially wide range of air/fuel ratios, according to claim 4, wherein:
the intermediate electrode comprises a tapering cylindrical member having a first end portion and a second end portion narrower than the first end portion,
the tapering cylindrical member having a rod-shaped electrode portion extending outward from the second end portion,
the first end portion being configured to seat the fuel injection nozzle therein; and
the tapering cylindrical member is provided with at least one throughgoing aperture for passage of a fuel charge from the fuel injection nozzle to the rod-shaped electrode portion.

11. A method for operating an internal combustion engine having at least one cylinder, the method comprising the steps of:
determining a load threshold within a load range of the internal combustion engine;
operating the internal combustion engine in a spark-ignited mode of operation when the determined load threshold is exceeded; and
operating the internal combustion engine in a homogenous-charge compression-ignited mode of operation when the determined load threshold is not exceeded,
wherein the homogenous-charge compression-ignited mode of operation comprises:
introducing a substantially homogenous charge of an air/fuel mixture into the cylinder during an intake stroke;
compressing the substantially homogenous charge of the air/fuel mixture in the cylinder during a compression stroke; and
combusting the substantially homogenous charge of the air/fuel mixture in the cylinder during a power stroke by injecting active radicals of combustion in to the cylinder.

12. A method for compression-igniting an air/fuel mixture in a cylinder of an internal combustion engine, the method comprising the steps of:
introducing a substantially homogenous charge of a first air/fuel mixture into the a cylinder during an intake stroke;
compressing the substantially homogenous charge of the first air/fuel mixture in the cylinder during a compression stroke; and
injecting partially combusted products of a second air/fuel mixture into the cylinder, thereby combusting the substantially homogenous charge of the first air/fuel mixture in the cylinder during a power stroke.

13. The method of claim 12 wherein the first air/fuel mixture has a substantially higher ratio, by weight, of air to fuel than the second air/fuel mixture.

14. An igniter for an internal combustion engine, the igniter comprising:
a body having an interior and an exterior, the interior defining a cavity surrounding a central axis, the body defining and an orifice communicating between the cavity and the exterior of the body;
a plurality of electrodes defining at least two spark gaps, wherein at least one of the spark gaps is disposed within the cavity; and
means for delivering fuel into the cavity.

15. An igniter for an internal combustion engine, according to claim 14, wherein:
at least one spark gap is disposed on the exterior of the body.

16. An igniter for an internal combustion engine, according to claim 14, wherein:
the spark gaps are electrically connected in series.

* * * * *